(12) United States Patent
Rodgers et al.

(10) Patent No.: US 8,683,212 B2
(45) Date of Patent: Mar. 25, 2014

(54) METHOD AND SYSTEM FOR SECURELY LOADING CODE IN A SECURITY PROCESSOR

(75) Inventors: Stephane Rodgers, San Diego, CA (US); Andrew Dellow, Minchinhampton (GB); Xuemin Chen, San Diego, CA (US); Iue-Shuenn Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1819 days.

(21) Appl. No.: 11/753,338

(22) Filed: May 24, 2007

(65) Prior Publication Data

US 2008/0084273 A1    Apr. 10, 2008

Related U.S. Application Data

(60) Provisional application No. 60/828,536, filed on Oct. 6, 2006.

(51) Int. Cl.
*G05B 19/00* (2006.01)

(52) U.S. Cl.
USPC .................................. 713/187; 713/1; 713/2

(58) Field of Classification Search
USPC ................................................ 713/1, 2, 187
See application file for complete search history.

(56) References Cited

U.S. PATENT DOCUMENTS 7,634,807 B2 * 12/2009 Yan et al. ........................ 726/22
7,636,442 B2 * 12/2009 Scarlata et al. .............. 380/283

2002/0144104 A1 * 10/2002 Springfield et al. .............. 713/2
2005/0021968 A1 *  1/2005 Zimmer et al. ................ 713/176
2006/0075223 A1 *  4/2006 Bade et al. ..................... 713/162

OTHER PUBLICATIONS

Pearson et al. "Trusted Computing Platforms: TCPA Technology in Context" © 2002 Prentice Hall Inc. (347 pages).*
"chipset.gif" from Computer Desktop Encyclopedia, © 2001 Computer Language Co. Inc. (1 page) http://common.ziffdavisinternet.com/encyclopedia_images/CHIPSET.GIF.*
"Chipset: Northbridge and Southbridge" Article last modified on Jan. 27, 2006 (1 page) http://www.rigacci.org/wiki/doku.php/doc/appunti/hardware/chipset.*

* cited by examiner

*Primary Examiner* — Joseph P. Hirl
*Assistant Examiner* — Thomas Gyorfi
(74) *Attorney, Agent, or Firm* — Sterne, Kessler, Goldstein & Fox P.L.L.C.

(57) ABSTRACT

Securely loading code in a security processor may include autonomous fetching an encrypted security data set, which may comprise security code and/or root keys, by a security processor integrated within a chip. The encrypted security data set may be decrypted via the on-chip security processor and the decrypted code set may be validated on-chip using an on-chip locked value. The on-chip locked value may be stored in a one-time programmable read-only memory (OTP ROM) and may include security information generated by applying one or more security algorithms, for example SHA-based algorithms, to the security data set. The encryption of the security data set may utilize various security algorithms, for example AES-based algorithms. The on-chip locked value may be created and locked after a virgin boot of a device that includes the security processor. The security data set may be authenticated during the virgin boot of the device.

27 Claims, 7 Drawing Sheets

METHOD AND SYSTEM FOR SECURELY LOADING CODE IN A SECURITY PROCESSOR

CROSS-REFERENCE TO RELATED APPLICATIONS/INCORPORATION BY REFERENCE

This patent application makes reference to, claims priority to and claims benefit from U.S. Provisional Patent Application Ser. No. 60/828,536 filed on Oct. 6, 2006.

This application also makes reference to:
U.S. patent application Ser. No. 11/753,474 filed on even date herewith; and
U.S. patent application Ser. No. 11/753,414 filed on even date herewith.

Each of the above stated applications is hereby incorporated herein by reference in its entirety.

FIELD OF THE INVENTION

Certain embodiments of the invention relate to system code loading. More specifically, certain embodiments of the invention relate to a method and system for securely loading code in a security processor.

BACKGROUND OF THE INVENTION

In an increasingly security-conscious world, protecting access to information and/or to systems from unwanted discovery and/or corruption is a major issue for both consumers and businesses.

The growth of system connectivity has been one of the major developments in recent years. Fewer and fewer systems are operating as stand-alone boxes, and most of today's systems are increasingly becoming elements of complex networks. This growth in networking allows improved performance and increased flexibility. However, with this growth in system distribution, system security, and protection against unwanted access and/or corruption, has become a major concern for systems owners and/or operators. Many consumers and systems owners and/or operators may be vulnerable to unwanted access when the level of security provided within the system is insufficient for providing the appropriate protection. In that regard, many deployed systems, may incorporate the use of architectures that enable and improve security management in order to provide the necessary protection from unwanted access.

Many systems have dedicated security sub-systems, which in addition to monitoring the system security throughout its operations, may also function to ensure that the systems are initially loaded securely. These systems may also comprise processing units, which may be required to perform general processing functions including, but is not limited to, loading code and/or data, performing code validation, executing code instructions, and performing memory manipulations. If the system is to be loaded securely, such processing unit need to be assured that it is executing clean code. However, assuring the security of the system may require use of the processing unit because certain aspects of security procedures may entail use of general processing functions, for example, code loading and validation. Therefore, the system in general, and the processing unit in particular, may be exposed to potential security threats and breaches while the system security is being assured.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for securely loading code in a security processor, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for securely loading code in a security processor may comprise autonomous fetching an encrypted security data set by a security processor integrated within a chip. The encrypted security data set may be decrypted via the on-chip security processor and the decrypted data set may be validated on-chip using an on-chip locked value. The on-chip locked value may be stored in a one-time programmable read-only memory (OTP ROM) and may comprise security information generated by applying one or more security algorithms, for example SHA-based algorithms, to the security data set. The encryption of the security data set may utilize various security algorithms, for example AES-based algorithms. The on-chip locked value may be created and locked after a virgin boot of a device comprising the security processor. The security data set may be authenticated during the virgin boot of the device comprising the security processor. The security data set may comprise security code and/or root keys. Root keys are based on unchangeable chip-specific identification information, and may be used in authenticating code sets. The security code set may comprise code and/or data the security processor may utilize during secure system boots. The OTP ROM may be used to store information utilized to authenticate said security data set during secure system boots.

Figure 1:
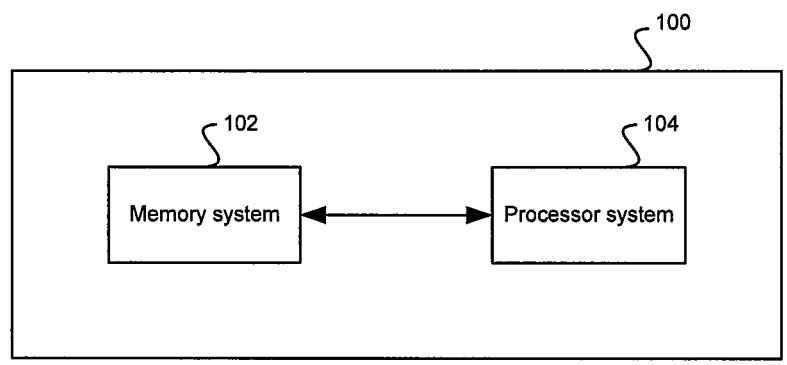
FIG. 1 is a block diagram illustrating an exemplary system, in connection with an embodiment of the invention.

FIG. 1 is a block diagram illustrating an exemplary system, in connection with an embodiment of the invention. Referring to FIG. 1, there is shown a system 100, a memory system 102, and a processor system 104.

The memory system 102 may comprise suitable logic, circuitry and/or code that may enable storage of code and data used by the processor system 104. The processor system 104 may comprise suitable logic, circuitry and/or code that may enable processing operations. The invention may not be limited to any specific processor, but may comprise for example, a general purpose processor, a specialized processor or any combination of suitable hardware, firmware, software and/or code, which may be enabled to provide securely loading code in a security processor, in accordance with the various embodiments of the invention. In this regard, the memory system 102 may comprise different memory technologies, including, for example, flash memory.

In operation, the processor system 104 may perform various processing operations including, but not limited to, processing data and performing code instructions. The processor system 104 may enable autonomous loading and execution of a security data set. The memory system 102 may allow storage of data and code used by the processor system 104, including, but not limited to, encrypted security data set.

During securely loading code in a security processor, the processor system 104 may autonomously load an encrypted security data set from the memory system 102, decrypt and validate (in either order) the autonomously loaded security data set, and then execute the security data set.

Figure 2:
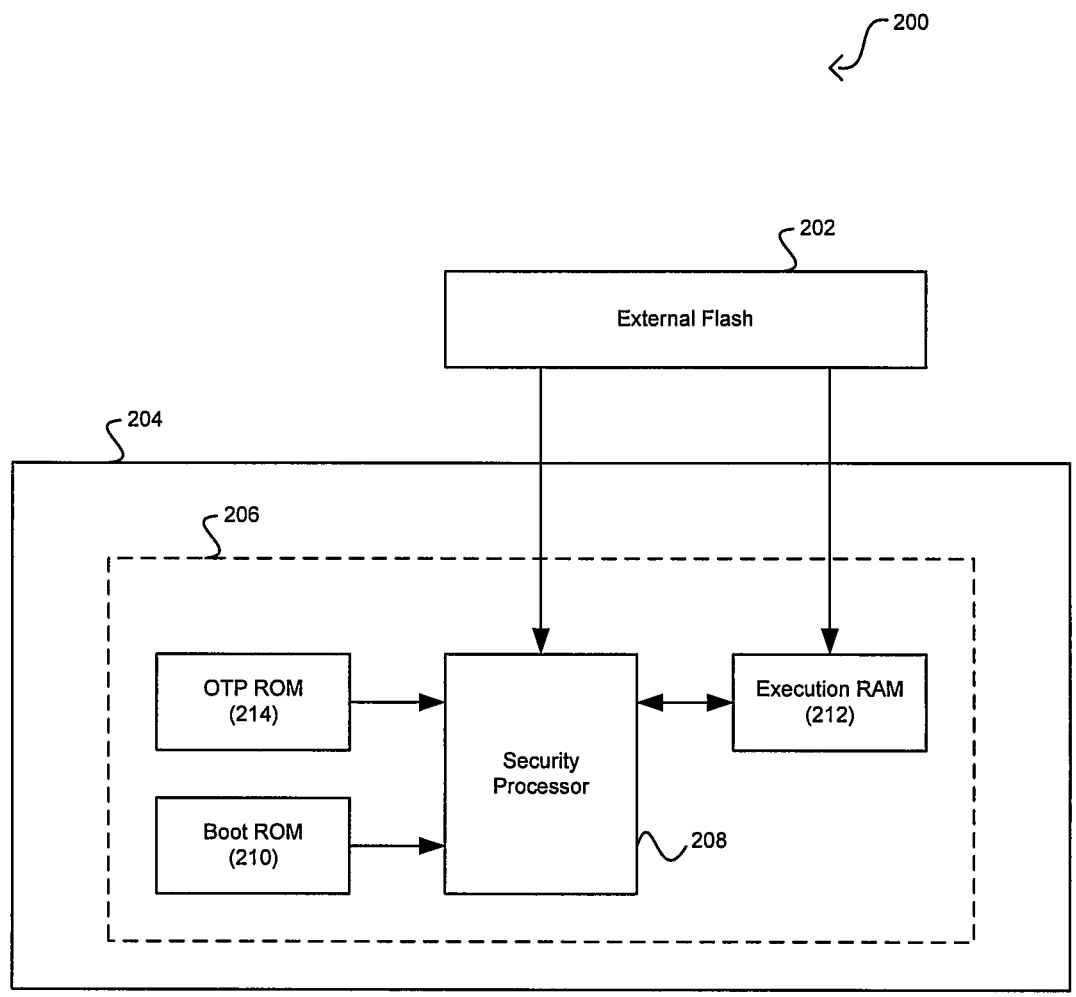
FIG. 2 is a block diagram illustrating an exemplary system that uses an external flash memory and a one-time programmable read-only memory (OTP ROM), which may be utilized in accordance with an embodiment of the invention.

FIG. 2 is a block diagram illustrating an exemplary system that uses an external flash memory and a one-time programmable read-only memory (OTP ROM), which may be utilized in accordance with an embodiment of the invention. Referring to FIG. 2, there is shown a system 200 that may comprise an external flash memory 202, a processor system 204, a security sub-system 206, a security processor 208, a boot read-only memory (boot ROM) 210, an execution random access memory (execution RAM) 212, and a one-time programmable read-only memory (OTP ROM) 214, which may be utilized in accordance with an embodiment of the invention.

The external flash memory 202 may comprise suitable logic, circuitry and/or code that may enable permanent storage of code and data used by the processor system 204. The processing system 204 may comprise a security sub-system 206, and other suitable logic, circuitry and/or code that may enable processing operations. The invention may not be limited to a specific processor, but may comprise for example, a general purpose processor, a specialized processor or any combination of suitable hardware, firmware, software and/or code, which may be enabled to provide securely loading code in a security processor, in accordance with the various embodiments of the invention.

The security sub-system 206 may comprise a security processor 208, a boot read-only memory (boot ROM) 210, an execution random access memory (execution RAM) 212, a one-time programmable read-only memory (OTP ROM) 214, and suitable hardware, firmware, software and/or code, which may be enabled to provide security operations.

The security processor 208 may comprise suitable logic, circuitry and/or code that may enable performing security operations. The boot ROM 210 may comprise suitable logic, circuitry and/or code that may enable storage of data and/or code that may be loaded and run to initiate security operations. The execution RAM 212 may comprise suitable logic, circuitry and/or code that may enable non-permanent storage and use of date and/or code used by security processor 208 during security operations. The OTP ROM 214 may comprise suitable logic, circuitry and/or code that may enable one-time programming of data and/or code that may be loaded and used by security processor 208 to validate a security data set during securely code load of said security processor.

In operations, the external flash memory 202 operates similar to the memory system 102 described in FIG. 1. The processor system 204 may perform various processing operations, which may include, but are not limited to, processing data and performing code instructions.

The security sub-system 206 may perform security operations that restrict and control processor system 204 operations in certain security situations, including, but not limited to, securely loading code in a security processor. The security processor 208 may perform such said security operations. The security processor 208 may fetch initial boot code and/or data from the boot ROM 210 to initiate securely loading code in a security processor. The security processor 208 may load the encrypted security data set from the external flash memory 202. The security processor 208 may decrypt the security data set and copy the decrypted security data set to the execution RAM 212. The security processor 208 may validate the security data set using locked value stored in the OTP ROM 214. When the security data set is found valid, the security processor 208 may execute the security data set from the execution RAM 212. Once the security data set is executed, the processor system 204 may be allowed to resume normal operation.

Figure 3:
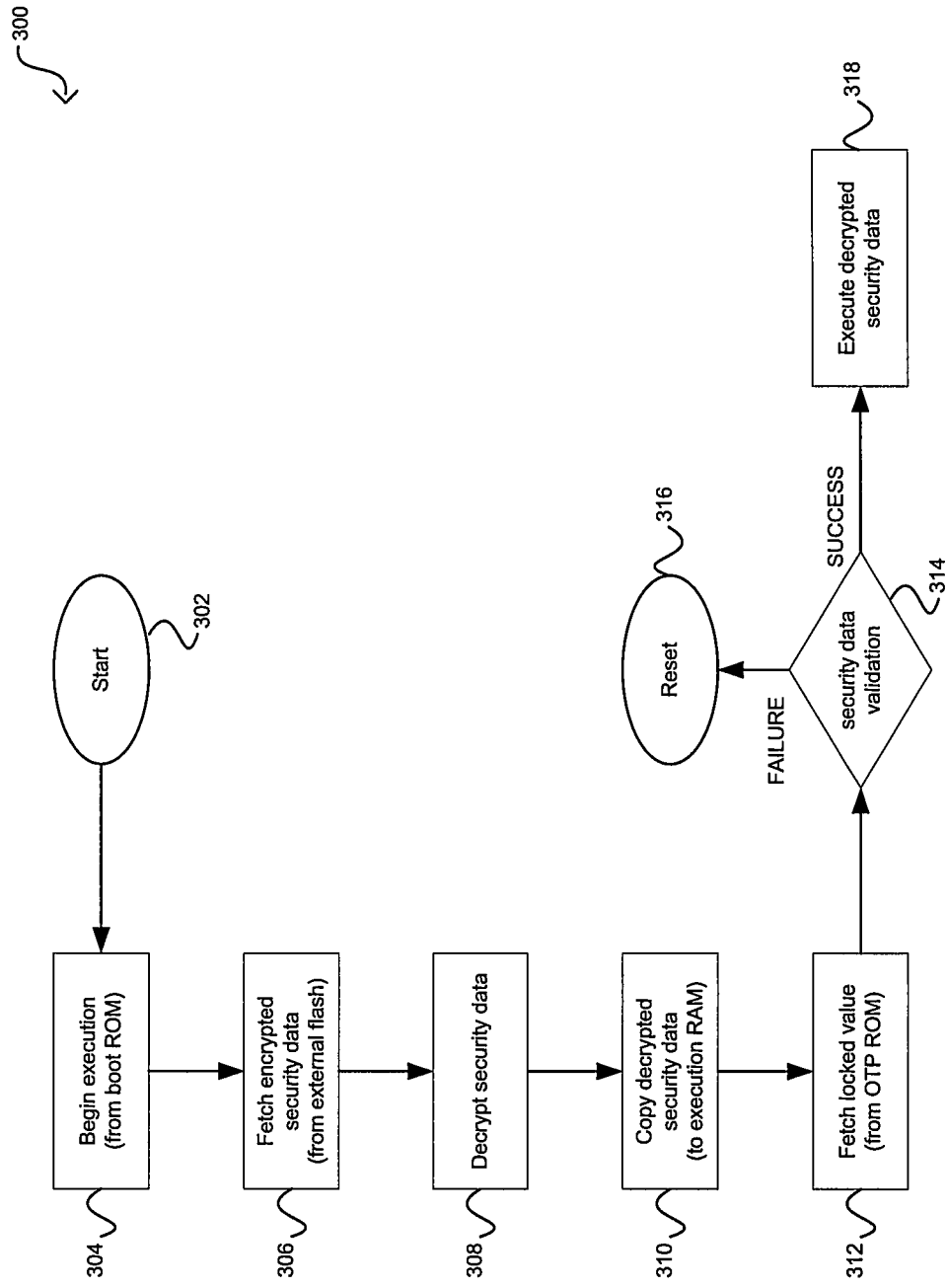
FIG. 3 is a flow diagram that illustrates an exemplary system that uses securely loading code in a security processor, which may be utilized in accordance with an embodiment of the invention.

FIG. 3 is a flow diagram that illustrates an exemplary system that uses securely loading code in a security processor, which may be utilized in accordance with an embodiment of the invention. Referring to FIG. 3, there is shown flow chart 300. In step 302, a securely loading code in a security processor may be initiated in the system 200. In step 304, the security processor 208 may initiate securely loading code by fetching and executing initial boot code and/or data from the boot ROM 210. In step 306, the security processor 208 may fetch the encrypted security data set stored in the external flash memory 202. In step 308, the security processor 208 may decrypt the encrypted security data set loaded from the external flash memory 202. The encryption and decryption of security data set may entail use of security algorithms, including, but not limited to AES-based algorithms. In step 310, the security processor 208 may copy the decrypted security data set to the execution RAM 212. In step 312, the security processor 208 may fetch a locked value from the OTP ROM 214. The locked value may be generated by the use of security algorithms, including, but not limited to SHA-based algorithms. In that regard, the locked value may comprise, for instance, the SHA digest of the decrypted security data set. In step 314, a validation of the decrypted security data set is performed. This may comprise determining the validity of the decrypted security data set using the locked value stored in the OTP ROM 214. In instances when the outcome of the validation of the security data set may result in FAILURE, the process may proceed to step 316. In step 316, the system 200 may be reset.

Returning to step 314, when the outcome of the validation of the security data set is SUCCESS, the process may proceed to step 318. In step 318, the security processor 208 executes the decrypted security data set from the execution RAM 212. This execution may comprise executing security code set and/or utilizing root keys to validate other code sets.

Figure 4:
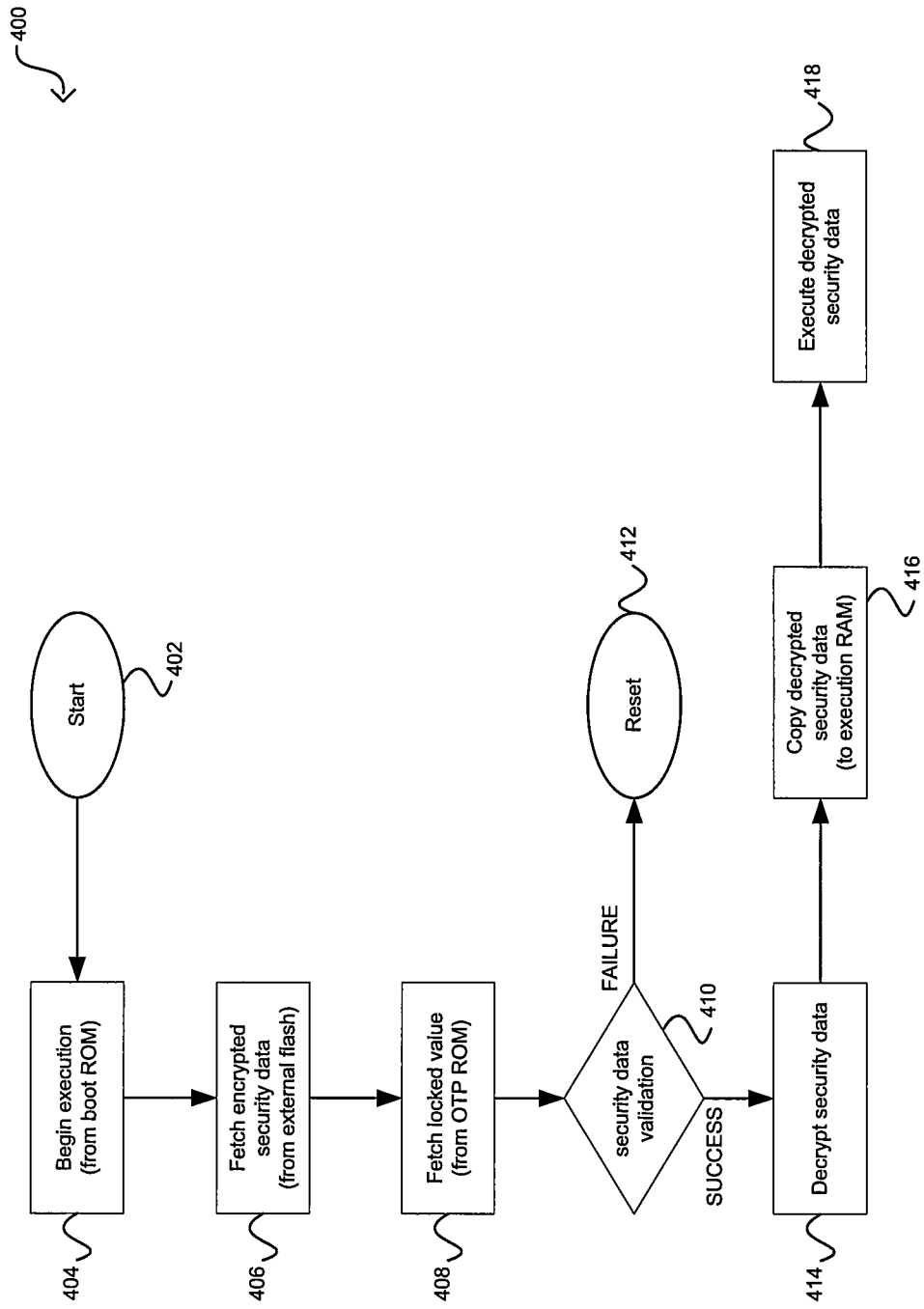
FIG. 4 is a flow diagram that illustrates an exemplary system that uses securely loading code in a security processor with post-validation decryption, which may be utilized in accordance with an embodiment of the invention.

FIG. 4 is a flow diagram that illustrates an exemplary system that uses securely loading code in a security processor with post-validation decryption, which may be utilized in accordance with an embodiment of the invention. Referring to FIG. 4, there is shown flow chart 400. In step 402, a securely loading code in a security processor may be initiated in the system 200. In step 404, the security processor 208 may initiate securely loading code by fetching and executing initial boot code and/or data from the boot ROM 210. In step 406, the security processor 208 may fetch the encrypted security data set stored in the external flash memory 202. In step 408, the security processor 208 may fetch a locked value from the OTP ROM 214. The locked value may be generated by the use of security algorithms, including, but not limited to SHA-based algorithms. In that regard, the locked value may comprise, for instance, the SHA digest of the encrypted security data set. In step 410, a validation of the encrypted security data set is performed. This may comprise determining the validity of the encrypted security data set using the locked value stored in the OTP ROM 214. In instances when the outcome of the validation of the security set may result in FAILURE, the process may proceed to step 412. In step 412, the system 200 may be reset Returning to step 410, when the outcome of the validation of the security data set is SUCCESS, the process may proceed to step 414. In step 414, the security processor 208 may decrypt the encrypted security data set loaded from the external flash memory 202. The encryption and decryption of security data set may entail use of security algorithms, including, but not limited to AES-based algorithms. In step 416, the security processor 208 may copy the decrypted security data set to the execution RAM 212. In step 418, the security processor 208 executes the decrypted security from the execution RAM 212. This execution may comprise executing security code set and/or utilizing root keys to validate other code sets.

Figure 5:
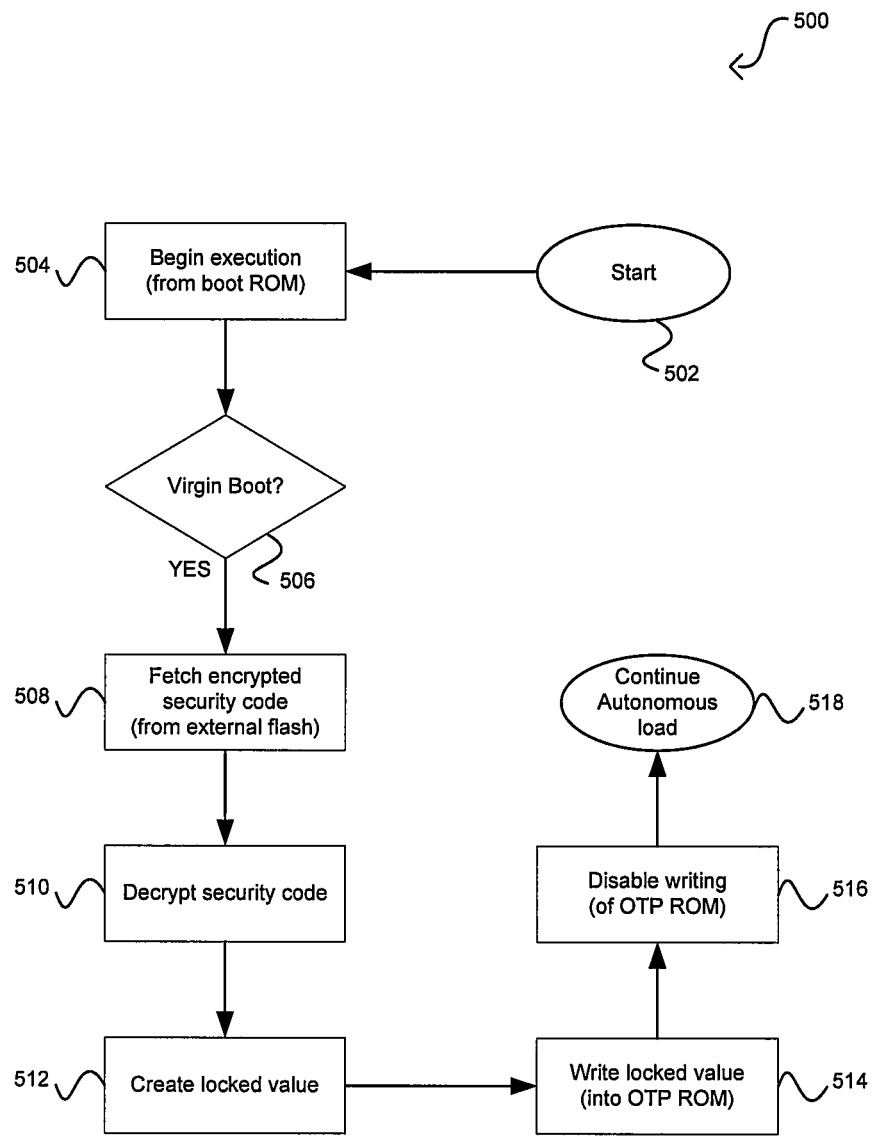
FIG. 5 is a flow diagram that illustrates an exemplary system that performs virgin boot, which may utilized in accordance with an embodiment of the invention.

FIG. 5 is a flow diagram that illustrates an exemplary system that performs virgin boot, which may utilized in accordance with an embodiment of the invention. Referring to FIG. 5, there is shown flow chart 500. In step 502, a securely loading code in a security processor may be initiated in the system 200. In step 504, the security processor 208 may initiate securely loading code by fetching and executing initial boot code and/or data from the boot ROM 210. In step 506, the security processor 208 checks to see if this was a virgin boot. Virgin boot is the very first system boot by a system operator and/or owner wherein there is no locked value stored in the system yet. In instances when the outcome of the virgin boot check may result in YES, the process may proceed to step 508. In step 508, the security processor 208 may fetch the encrypted security data set stored in the external flash memory 202. In step 510, the security processor 208 may decrypt the encrypted security data set loaded from the external flash memory 202. The encryption and decryption of security data set may entail use of security algorithms, including, but not limited to AES-based algorithms. In step 512, the security processor 208 may generate a locked value that corresponds to the decrypted security code. The locked value may be generated by use of security algorithms, including, but not limited to SHA-based algorithms. In that regard, the locked value may comprise, for instance, the SHA digest of the decrypted security data set. In step 514, the locked value is written into the OTP ROM 214, which at this point has not been programmed or locked yet. In step 516, the security processor 208 locks the OTP ROM 214. The OTP ROM 214 many not be reprogrammed after this step in subsequent securely loading codes in security process 208. In step 518, the security processor 208 may continue performing securely loading code in security processor 208.

Figure 6:
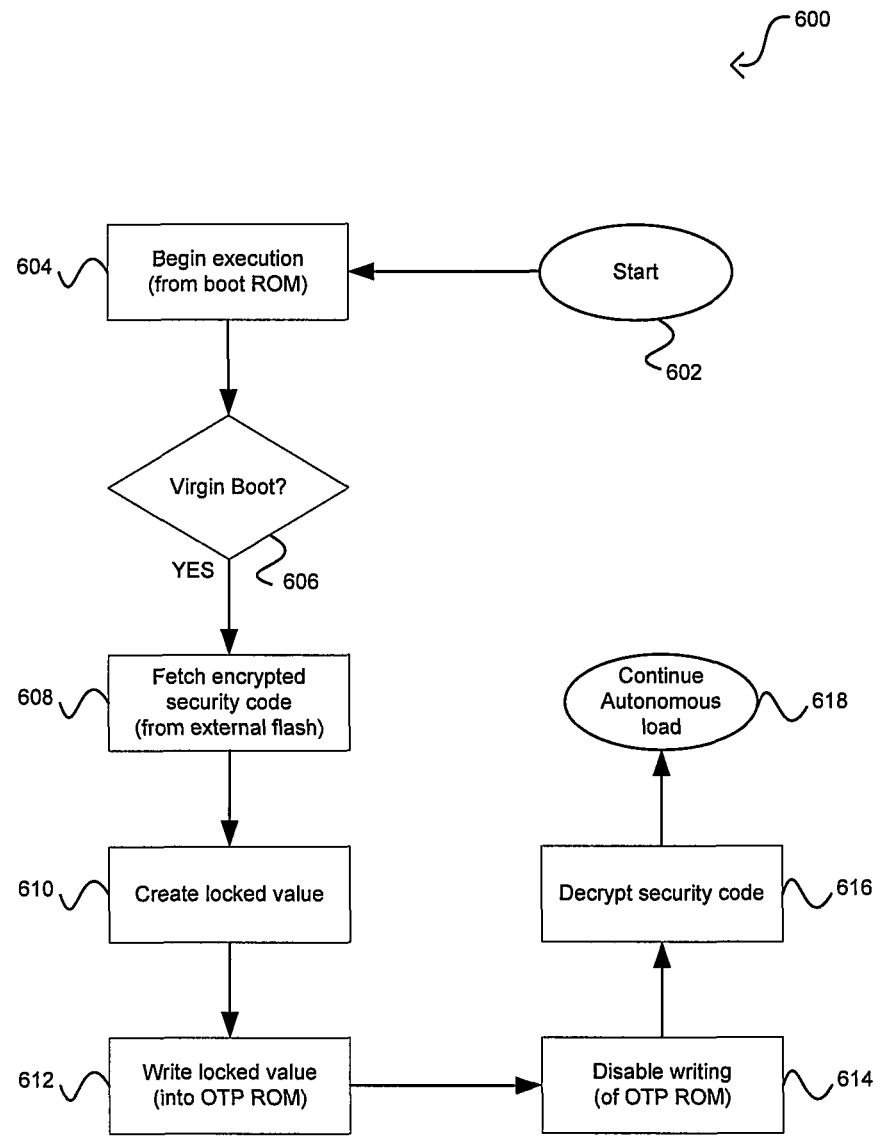
FIG. 6 is a flow diagram that illustrates an exemplary system that performs virgin boot wherein locked value corresponds to encrypted security data set, which may utilized in accordance with an embodiment of the invention.

FIG. 6 is a flow diagram that illustrates an exemplary system that performs virgin boot wherein locked value corresponds to encrypted security data set, which may utilized in accordance with an embodiment of the invention. Referring to FIG. 6, there is shown flow chart 600. In step 602, a securely loading code in a security processor may be initiated in the system 200. In step 604, the security processor 208 may initiate securely loading code by fetching and executing initial boot code and/or data from the boot ROM 210. In step 606, the security processor 208 checks to see if this was a virgin boot. In instances when the outcome of the virgin boot check may result in YES, the process may proceed to step 608. In step 608, the security processor 208 may fetch the encrypted security data set stored in the external flash memory 202. In step 610, the security processor 208 may generate a locked value that corresponds to the encrypted security code. The locked value may result from the use of security algorithms, including, but not limited to SHA-based algorithms. In that regard, the locked value may comprise, for instance, the SHA digest of the encrypted security data set. In step 612, the locked value is written into the OTP ROM 214, which at this point has not been programmed or locked yet. In step 614, the security processor 208 locks the OTP ROM 214. The OTP ROM 214 many not be reprogrammed after this step in subsequent securely loading codes in security process 208. In step 616, the security processor 208 may decrypt the encrypted security data set loaded from the external flash memory 202. The encryption and decryption of security data set may entail use of security algorithms, including, but not limited to AES-based algorithms. In step 618, the security processor 208 may continue performing securely loading code in a security processor.

Figure 7:
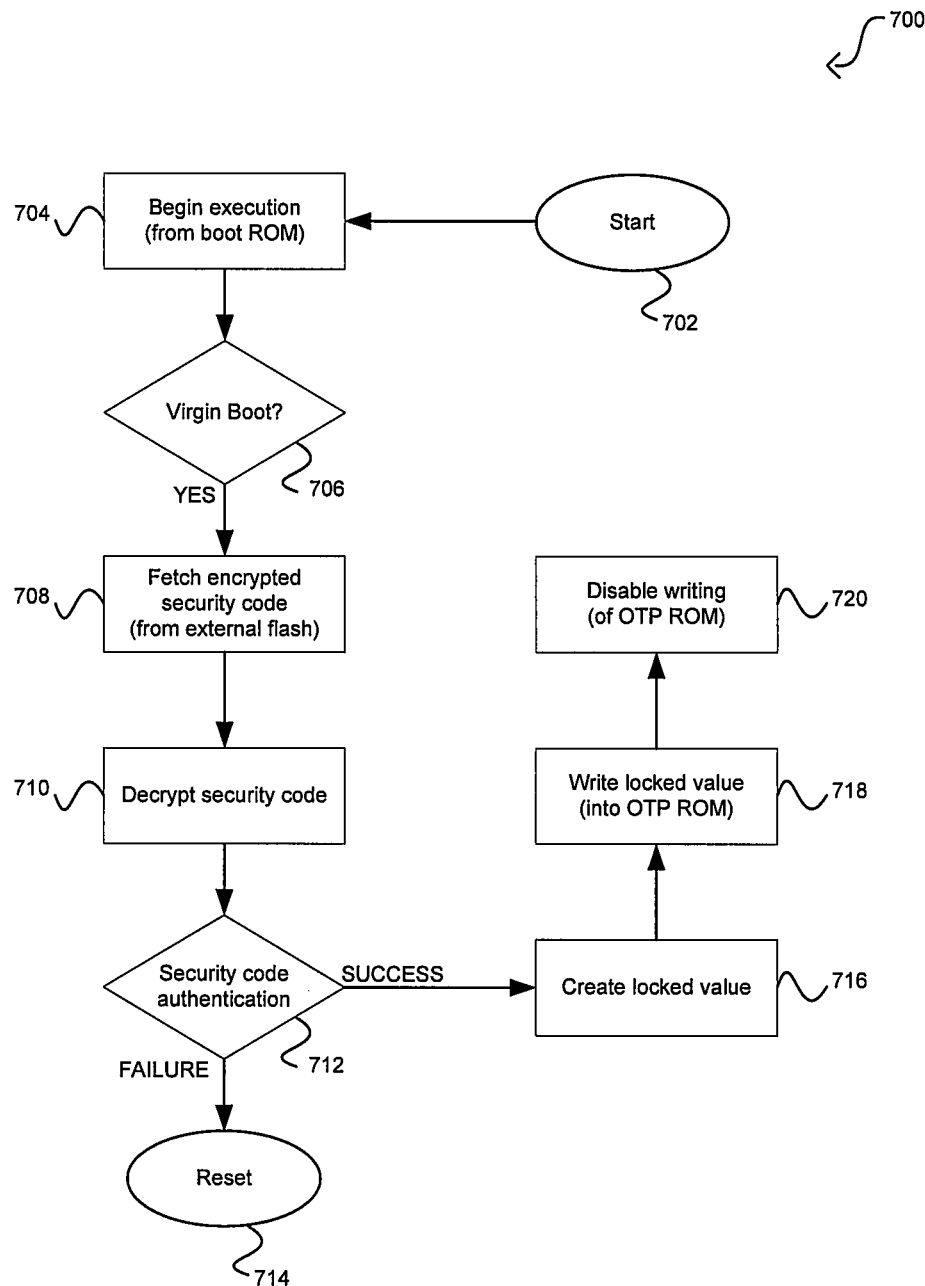
FIG. 7 is a flow diagram that illustrates an exemplary system that performs virgin boot, with authentication of security data set, which may utilized in accordance with an embodiment of the invention.

FIG. 7 is a flow diagram that illustrates an exemplary system that performs virgin boot, which may utilized in accordance with an embodiment of the invention. Referring to FIG. 7, there is shown flow chart 700. In step 702, a securely loading code in a security processor may be initiated in the system 200. In step 704, the security processor 208 may initiate securely loading code by fetching and executing initial boot code and/or data from the boot ROM 210. In step 706, the security processor 208 checks to see if this was a virgin boot. Virgin boot is essentially the very first system boot by a system operator and/or owner. In instances when the outcome of the virgin boot check may result in YES, the process may proceed to step 708. In step 708, the security processor 208 may fetch the encrypted security data set stored in the external flash memory 202. In step 710, the security processor 208 may decrypt the encrypted security data set loaded from the external flash memory 202. The encryption and decryption of security data set may entail use of security algorithms, including, but not limited to AES-based algorithms. In step 712, an authentication of the decrypted security data set is performed. The authentication of the decrypted security data set may comprise use of security algorithms, including but not limited to, RSA-based algorithms. In instances when the outcome of the authentication of the security data set may result in FAILURE, the process may proceed to step 710. In step 710, the system 200 may be reset.

Returning to step 712, when the outcome of the authentication of the security data set is SUCCESS, the process may proceed to step 716. In step 716, the security processor 208 may generate a locked value that corresponds to the decrypted security code. The locked value may be generated by use of security algorithms, including, but not limited to SHA-based algorithms. In that regard, the locked value may comprise, for instance, the SHA digest of the decrypted security data set. In step 718, the locked value is written into the OTP ROM 214, which at this point has not been programmed or locked yet. In step 720, the security processor 208 locks the OTP ROM 214.

Various embodiments of the invention may comprise a method and system for securely loading code in a security processor and may comprise autonomous fetching an encrypted security data set by a security processor integrated within a chip. The encrypted security data set may be decrypted via the on-chip security processor 208 and the decrypted code set may be validated on-chip using an on-chip locked value. The on-chip locked value may be stored in a one-time programmable read-only memory (OTP ROM) 214 and may comprise security information generated by applying one or more security algorithms, for example SHA-based algorithms, to the security data set. The encryption of the security data set may utilize various security algorithms, for example AES-based algorithms. The on-chip locked value may be created and locked after a virgin boot of a device comprising the security processor 208. The security data set may comprise security code and/or root keys. The security data set may be authenticated during the virgin boot of the device comprising the security processor 208.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for loading code in a communication system, the method comprising:
   autonomously fetching, from an external memory outside a secure sub-system, an encrypted security data set by an on-chip security processor integrated within said secure sub-system, wherein said encrypted security data set comprises one or more of code and root keys;
   decrypting said encrypted security data set via said on-chip security processor;
   initiating storing said decrypted security data set in an on-chip memory within said secure sub-system;
   validating said decrypted security data set using an on-chip locked value stored within said secure sub-system; and
   executing, with said on-chip security processor, code of said validated and decrypted security data set.

2. The method according to claim 1, wherein said on-chip locked value is stored in a one-time programmable read-only memory (OTP ROM) within said secure sub-system.

3. The method according to claim 1, wherein said on-chip locked value comprises chip-based identification information that enables authenticating said root keys.

4. The method according to claim 1, wherein said on-chip locked value comprises security information generated by applying one or more security algorithms to said security data set.

5. The method according to claim 4, wherein said security algorithms comprise Secure Hash Algorithm (SHA) based algorithms.

6. The method according to claim 4, wherein said security algorithms comprise Advanced Encrypted Standard (AES) based algorithms.

7. The method according to claim 1, further comprising creating and locking said on-chip locked value after a virgin boot of said security processor.

8. The method according to claim 7, further comprising authenticating said security data set during said virgin boot of said security processor.

9. The method according to claim 1, further comprising initiating resetting of said communication system in response to an unsuccessful validation of said decrypted security data set.

10. A machine-readable storage medium having stored thereon a computer program having at least one code section for loading code in a communication system, the at least one code section being executable by a machine for causing the machine to perform steps comprising:
    autonomously fetching, from an external memory outside a secure sub-system, an encrypted security data set by an on-chip security processor integrated within said secure sub-system, wherein said encrypted security data set comprises one or more of code and root keys;
    decrypting said encrypted security data set via said security processor;
    initiating storing said decrypted security data set in an on-chip memory within said secure sub-system;
    validating said decrypted security data set using a locked value stored within said secure sub-system; and
    executing, with said on-chip security processor, code of said validated and decrypted security data set.

11. The machine-readable storage medium according to claim 10, wherein said on-chip locked value is stored in a one-time programmable read-only memory (OTP ROM) within said secure sub-system.

12. The machine-readable storage medium according to claim 10, wherein said on-chip locked value comprises chip-based identification information that enables authenticating said root keys.

13. The machine-readable storage medium according to claim 10, wherein said on-chip locked value comprises security information generated by applying one or more security algorithms to said security data set, and wherein said security algorithms comprise Secure Hash Algorithm (SHA) based algorithms.

14. The machine-readable storage medium according to claim 10, wherein said on-chip locked value comprises security information generated by applying one or more security algorithms to said security data set, and wherein said security algorithms comprise Advanced Encrypted Standard (AES) based algorithms.

15. The machine-readable storage medium according to claim 10, wherein said at least one code section comprises code for creating and locking said on-chip locked value after a virgin boot of said security processor.

16. The machine-readable storage medium according to claim 15, wherein said at least one code section comprises code for authenticating said security data set during said virgin boot of said security processor.

17. The machine-readable storage medium according to claim 10, wherein said at least one code section comprises code for initiating resetting of said communication system in response to an unsuccessful validation of said decrypted security data set.

18. A system for loading code in a communication device, the system comprising:
   a first memory within a secure sub-system, wherein said first memory is configured to store a locked value;
   a second memory within said secure sub-system, wherein said second memory is configured to store a decrypted security data set; and
   a security processor within said secure sub-system, wherein said security processor is coupled to said first memory and said second memory, and wherein said security processor is configured to:
      autonomously fetch, from a memory external to said secure sub-system, an encrypted security data set, wherein said encrypted security data set comprises one or more of code and root keys,
      decrypt said encrypted security data set,
      initiate storing said decrypted security data set in said second memory,
      validate said decrypted security data set using said locked value, and
      execute code of said validated and decrypted security data set in response to a successful validation of said decrypted security data set.

19. The system according to claim 18, wherein said locked value comprises chip-based identification information that enables authenticating said root keys.

20. The system according to claim 18, wherein said locked value comprises security information generated by applying one or more security algorithms to said security data set.

21. The system according to claim 20, wherein said one or more security algorithms comprise a Secure Hash Algorithm (SHA).

22. The system according to claim 18, wherein said security data set is encrypted using an Advanced Encrypted Standard (AES) algorithm.

23. The system according to claim 18, wherein said security processor is further configured to create and lock said locked value after a virgin boot of said security processor.

24. The system according to claim 23, wherein said security processor is further configured to authenticate said security data set during said virgin boot of said security processor.

25. The system according to claim 18, further comprising:
   a third memory within said secure sub-system, wherein said third memory is configured to store secure boot code, and wherein said security processor is further configured to initiate loading of said secure boot code into said security processor.

26. The system according to claim 18, wherein said security processor is further configured to initiate resetting said system in response to an unsuccessful validation of said decrypted security data set.

27. The system according to claim 18, wherein said memory external to said secure sub-system is a flash memory.

* * * * *